Jan. 30, 1934.    L. E. DUPUY    1,945,482
CONVEYER SYSTEM
Filed Nov. 21, 1930
Fig. 1.
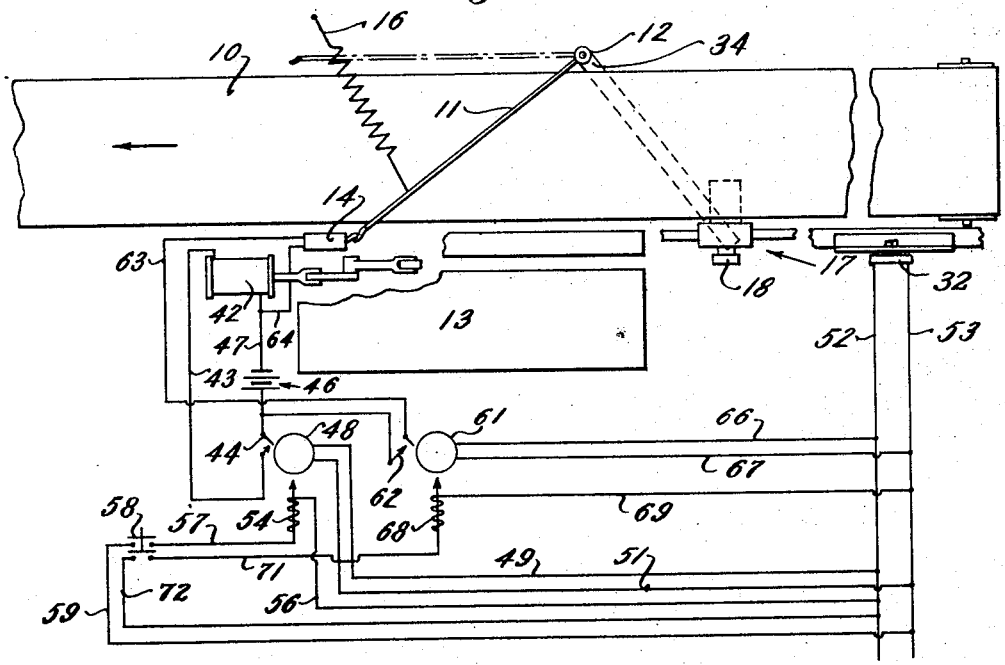
Fig. 2.
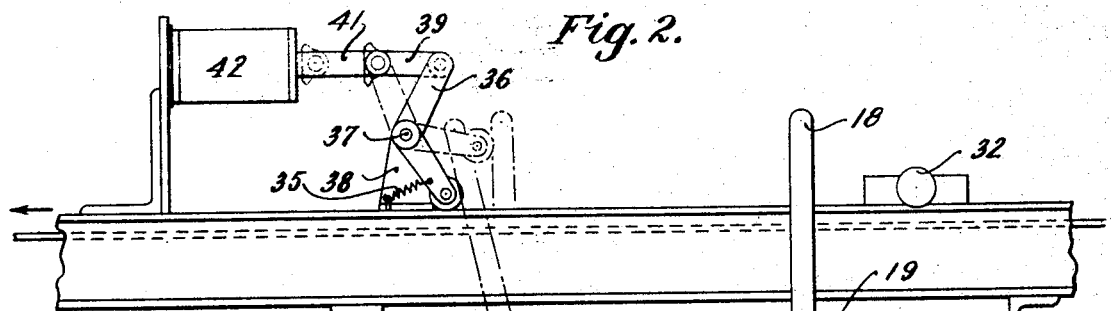
Fig. 3.
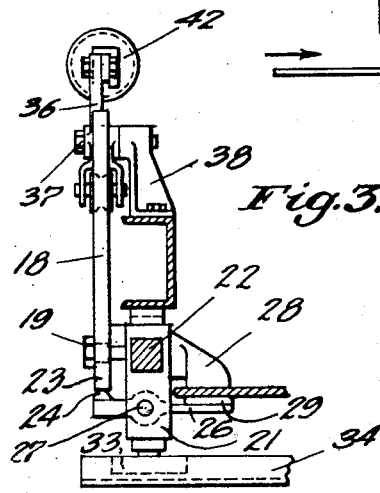
Fig. 4.
Inventor,
Louis E. Dupuy
by Roberts Cushman Woodberry
Att'ys.

Patented Jan. 30, 1934

1,945,482

UNITED STATES PATENT OFFICE 1,945,482

CONVEYER SYSTEM

Louis E. Dupuy, Syracuse, N. Y., assignor to The Lamson Company, Syracuse, N. Y., a corporation of Massachusetts Application November 21, 1930
Serial No. 497,190

4 Claims. (Cl. 198—20)

This invention relates to the art of conveying articles along different courses and to a system of the type disclosed in my copending application Serial No. 446,531, filed April 23, 1930, and embodying conveying apparatus having means for changing the course of travel of articles and also to various means for causing an article to change its course while traveling in such a system.

Objects of the present invention are to provide means for effecting the transfer of articles from one conveyer to another conveyer or to a station disposed either at the same or at a different level; to provide movable means operable in properly timed relation for effecting the transfer of any particular article as well as to provide for restoring the movable means to its normal or inoperative position after the desired transfer has been effected; to provide for transmitting power from a conveyer belt to the movable means for actuating the latter to effect the desired transfer or change in direction of travel of an article; to provide for actuating the movable means from belt gripping mechanism in properly timed relation to change the course of an article as the latter arrives at a predetermined point; and also to provide apparatus for these purposes having an improved construction and arrangement of parts.

In the drawing:

Fig. 1 is a top plan view of conveying apparatus embodying means for changing the direction of travel of an article;

Fig. 2 is a side elevation of belt gripping mechanism and means for actuating the latter, as shown in Fig. 1;

Fig. 3 is a sectional view showing the belt gripping mechanism in end elevation; and Fig. 4 is a similar view of a modified portion of the gripping mechanism adapted to engage a cable.

The apparatus selected for illustration in Figs. 1, 2, 3 and 4 comprises a belt conveyer 10 equipped with means for changing the course of travel of an article here shown in the form of a deflector 11 which is mounted to pivot at the side of the conveyer at 12 and is movable to a position diagonally across the conveyer for deflecting articles onto a receiving shelf or station 13. A releasable locking means 14 is disposed in position to engage the free end of the deflector 11 to hold the deflector across the conveyer for effecting the desired transfer. This locking means preferably is in the form of a spring actuated lock which engages the end of the deflector to hold the latter securely in the position shown until released by a solenoid. A releasable locking means of this type is fully disclosed in my copending application to which reference may be had for a more complete description thereof. A spring 16 is connected to any fixed support and to the movable deflector 11 for returning the latter to its normal or inoperative position along side of the conveyer, as shown in dot and dash lines.

Belt gripping mechanism engageable with one run of the belt indicated generally at 17 in Fig. 1 and shown more in detail in Fig. 2 is mounted for movement longitudinally of the conveyer and comprises an actuating lever 18 which is mounted to pivot at 19 on a carriage 21 slidable on a supporting rod 22. The lower end or nose 23 of the lever 18 is adapted to engage the cam surface 24 of a lower member 26 which is mounted to pivot on the carriage at 27. As shown more clearly in Fig. 3, the carriage is provided with a fixed jaw 28 and the inner end 29 of the lower movable member 26 constitutes a movable jaw which is adapted to cooperate with the fixed jaw. The inner end 29 of the movable member 26 is disposed in spaced relation with respect to the fixed jaw 28, these parts being normally so positioned that the lower run of the conveyer belt 10 may pass freely therebetween. Yieldable means such as the coil springs 31 are connected between the movable member 26 and the carriage 21 so as to urge the movable jaw away from the fixed jaw 27.

The movement of the lever 18 manually or otherwise as described hereinbelow in a clockwise direction, as viewed in Fig. 2, due to its engagement with the cam surface 24, causes the lower jaw or end 29 of the movable member 26 to move upwardly, whereby the belt is gripped between the fixed jaw 28 and the movable part or jaw 29. This movement locks the carriage 21 to the moving belt and thus causes the belt gripping mechanism to travel with the belt until the operating lever 18 is brought into engagement with an abutment 32 disposed in the path of travel of this lever and preferably mounted to be adjustable longitudinally of the main conveyer for tripping the lever 18 after any desired travel thereof. During travel of the belt gripping mechanism the handle 18 moves through a slot 31 in the receiving shelf 13.

The belt gripping mechanism carries a depending roller 33 which is disposed in an upwardly facing channel member 34, the latter being disposed transversely of the conveyer and rigidly connected to the movable deflector 11 at the pivotal mounting of this deflector. As the channel member 34 is moved about the axis of the pivotal mounting 12 the deflector is moved either to its position across the conveyer or to its inoperative position, depending on direction of movement of the channel bar 34. It will be understood that the abutment 32 is positioned in this instance to trip the lever 18 at the proper time to lodge the free end of the deflector 11 in the locking device 14. Belt gripping mechanism of this type is fully disclosed in the copending application previously identified herein and to which reference may be had for a more complete understanding of the purposes and mode of operation of this apparatus.

In its inoperative position the belt gripping mechanism occupies substantially the position shown in the dot and dash lines shown in Fig. 2 in which it will be observed that the operating lever 18 occupies a slightly inclined position. For the purpose of rendering the belt gripping mechanism effective for gripping the belt, there is provided a bell crank 36 which is mounted to pivot at 37 on a bracket 38 and pivotally connected by a link 39 to the core piece 41 of a solenoid 42. The bell crank 36 is yieldably held in the full line position shown in Fig. 2 by a spring 35 but is movable to the dot and dash line position against the tension of this spring when the solenoid 42 is energized.

One terminal of the solenoid 42 is connected by a wire 43 through a switch 44 to a source of electrical energy 46, while the other terminal of the solenoid is connected with the source of electrical energy by a wire 47. A delayed action timing device 48, preferably of the type disclosed in the patent to Spooner No. 1,528,227, is provided for actuating the switch 44. The rotor of this timing device is supplied with electrical energy through the leads 49 and 51 which are connected to the mains 52 and 53. The charging solenoid 54 of this timing device is connected to the main 52 by a wire 56 and to the main 53 by a lead 57 through a double contact switch 58 and the wire 59. A similar timing device 61 is provided for actuating the switch 62 disposed in line 63 leading from one terminal of the solenoid lock 14 to the source of electrical energy 46. The other terminal of this solenoid lock is connected to the source of energy through a wire 64. The rotor of the timing device 61 is supplied with electrical energy from the mains 52 and 53 through the leads 66 and 67. The charging solenoid 68 of this timing device is connected to the main 53 by a wire 69 and to the main 52 through the wire 71, double contact switch 58 and the wire 72.

The timing devices 48 and 61 are so constructed that when actuated simultaneously the device 61 will function to close the switch 62 after the device 48 has functioned to close the switch 44. The push button or double contact switch 58 is adapted to be located at some point in the conveyer system remote from the station 13 and the timing devices are set so that an operator may depress the switch 58 and close the circuits to the timing devices, as an article is passing this remote point. When this article arrives at the proper position to be deflected by the deflector 11 the timing device 48 actuates the switch 44, thereby energizing the solenoid 42 which causes the belt gripping mechanism 17 to grip the belt. This belt gripping mechanism then moves with the belt and carries the deflector to the position shown in Fig. 1, in which it is locked by the releasable locking device 14. The timing device 61 is set to close the switch 62 after the article has been deflected on to the receiving station 13 and thus to release the deflector 11 after the transfer of this article so as to permit the spring 16 to return this deflector to its normal or inoperative position. Other articles traveling on the conveyer may therefore be permitted to pass the station 13.

In the modification of the belt gripping mechanism shown in Fig. 4, the fixed jaw 28' and the movable jaw 29' have complementary recesses 30 and 30' adapted to receive and to grip a cable should the conveying surface be composed of such cables.

It should be understood that the present disclosure is for the purpose of illustration only and that this invention includes all modifications and equivalents which fall within the scope of the appended claims.

I claim:

1. Conveying apparatus comprising a belt conveyer, movable means for changing the course of travel of an article, belt gripping mechanism engageable with the belt conveyer for travel therewith, timing mechanism for actuating the belt gripping mechanism after a predetermined time interval, means controllable independently of the article for rendering the timing mechanism effective, and means for transmitting motion from the belt gripping mechanism during travel thereof to the movable means to actuate the latter to change the course of travel of an article.

2. Conveying apparatus comprising a belt conveyer, movable means for changing the course of travel of an article, belt gripping mechanism engageable with the belt conveyer for travel therewith, electromagnetic means for effecting engagement of the belt gripping mechanism with the belt conveyer, a timing device operable after a predetermined time interval for actuating the electromagnetic means, means controllable by an operator for rendering the timing device effective, and means for transmitting motion from the belt gripping mechanism during travel thereof to the movable means to actuate the latter to change the course of travel of an article.

3. Conveying apparatus comprising a belt conveyer, means movable from a first position to a second position for changing the course of travel of an article, means tending to hold the movable means in the first position, belt gripping mechanism engageable with the belt conveyer for travel therewith, timing mechanism for actuating the belt gripping mechanism after a predetermined time interval, means for transmitting motion from the belt gripping mechanism during travel thereof to the movable means for moving the latter to the second position thereof, releasable means effective for holding the movable means in this position, and other timing mechanism operable after a predetermined time interval for releasing the releasable means so that the means tending to hold the movable means in the first position may become effective for returning the movable means to this position.

4. Conveying apparatus comprising a belt conveyer, means movable from a first position to a second position for changing the course of travel of an article, means tending to hold the movable means in the first position, belt gripping mechanism engageable with the belt conveyer for travel therewith, timing mechanism for actuating the belt gripping mechanism after a predetermined time interval, means for transmitting motion from the belt gripping mechanism during travel thereof to the movable means for moving the latter to the second position thereof, releasable means effective for holding the movable means in this position, other timing mechanism operable after a predetermined time interval for releasing the releasable means so that the means tending to hold the movable means in the first position may become effective for returning the movable means to this position, and means controllable by an operator at a point remote from the movable means for starting both timing mechanisms substantially simultaneously.

LOUIS E. DUPUY.